(12) United States Patent
Laifenfeld et al.

(10) Patent No.: US 10,101,433 B2
(45) Date of Patent: Oct. 16, 2018

(54) METHODS FOR LOCATING A VEHICLE KEY FOB

(71) Applicant: GM Global Technology Operations LLC, Detroit, MI (US)

(72) Inventors: Moshe Laifenfeld, Haifa (IL); Vyacheslav Berezin, Newmarket (CA); Igal Kotzer, Tel-Aviv (IL); Kobi Jacob Scheim, Pardess Hanna (IL)

(73) Assignee: GM Global Technology Operations LLC, Detroit, MI (US)

( * ) Notice: Subject to any disclaimer, the term of this patent is extended or adjusted under 35 U.S.C. 154(b) by 288 days.

(21) Appl. No.: 14/702,459

(22) Filed: May 1, 2015

(65) Prior Publication Data
US 2016/0320469 A1    Nov. 3, 2016

(51) Int. Cl.
*G01S 5/02* (2010.01)
*G01S 5/14* (2006.01)
*G01S 5/00* (2006.01)

(52) U.S. Cl.
CPC ............. *G01S 5/0284* (2013.01); *G01S 5/14* (2013.01)

(58) Field of Classification Search
CPC .. A61B 5/411; G07C 9/00182; H04B 1/3822; B60R 25/24; B60R 25/245; B60R 25/1001; B60R 25/257; B60R 25/2009; G01S 13/0209; G01S 3/48; G01S 5/0252; G01S 3/50; G01S 5/0284; G01S 5/14; G01S 13/74; H04W 8/22; H04W 4/046; H04W 4/008; G01M 17/007; G08B 21/24; G08B 21/0261; G01C 17/38

USPC ..................................................... 342/458
See application file for complete search history.

(56) References Cited

U.S. PATENT DOCUMENTS

| | | | | |
|---|---|---|---|---|
| 6,297,737 B1 * | 10/2001 | Irvin | ................. | G08B 21/24 |
| 6,895,310 B1 * | 5/2005 | Kolls | ................. | G01M 17/007 |
| | | | | 341/123 |
| 7,479,889 B2 * | 1/2009 | Kazdin et al. | ..... | G08B 21/0261 |
| 7,548,491 B2 * | 6/2009 | Macfarlane | ........ | B60R 25/257 |
| | | | | 340/426.35 |
| 8,335,502 B2 * | 12/2012 | Oesterling | ............ | H04W 4/046 |
| | | | | 455/419 |
| 8,373,581 B2 * | 2/2013 | Hassan et al. | ........ | G01C 17/38 |
| 8,494,447 B2 * | 7/2013 | Oesterling | ........... | H04B 1/3822 |
| | | | | 455/41.2 |
| 8,547,253 B2 * | 10/2013 | Proefke et al. | ......... | G01S 13/74 |
| 8,571,725 B2 * | 10/2013 | Juzswik | ............... | B60R 25/245 |
| 9,154,920 B2 * | 10/2015 | O'Brien et al. | ...... | H04W 4/046 |
| 2003/0231550 A1 * | 12/2003 | Macfarlane | ........... | B60R 25/257 |
| | | | | 367/198 |
| 2005/0099275 A1 * | 5/2005 | Kamdar | ............... | B60R 25/2009 |
| | | | | 340/426.18 |
| 2005/0107673 A1 * | 5/2005 | Ball | ........................ | A61B 5/411 |
| | | | | 600/301 |
| 2007/0090965 A1 * | 4/2007 | McCall | ................... | G08B 21/24 |

(Continued)

*Primary Examiner* — Bernarr E Gregory
(74) *Attorney, Agent, or Firm* — David Willoughby; Reising Ethington P.C.

(57) ABSTRACT

A system and method of locating a key fob with respect to a vehicle includes: detecting short-range wireless signals communicated between the key fob and a plurality of nodes at the vehicle using an IEEE 802.11 protocol; calculating the distance of the key fob relative to each of the nodes attached to the vehicle based on the detected short-range wireless signal; and determining the location of the key fob based on the distance of the key fob relative to each of the nodes.

17 Claims, 3 Drawing Sheets

(56) References Cited

U.S. PATENT DOCUMENTS

| | | | |
|---|---|---|---|
| 2007/0268110 A1* | 11/2007 | Little | B60R 25/24 |
| 2010/0076622 A1* | 3/2010 | Dickerhoof et al. | B60R 25/24 |
| 2010/0302102 A1* | 12/2010 | Desai | G01S 3/50 |
| | | | 342/417 |
| 2010/0305779 A1* | 12/2010 | Hassan et al. | G01C 17/38 |
| 2011/0040424 A1* | 2/2011 | Lickfelt | B60R 25/24 |
| | | | 701/2 |
| 2011/0148573 A1* | 6/2011 | Ghabra | B60R 25/245 |
| | | | 340/5.61 |
| 2012/0092129 A1* | 4/2012 | Lickfelt | B60R 25/24 |
| 2012/0244877 A1* | 9/2012 | Margalef | G01S 5/0252 |
| | | | 455/456.1 |
| 2013/0017816 A1* | 1/2013 | Talty | H04W 4/008 |
| | | | 455/418 |
| 2013/0188538 A1* | 7/2013 | Kainulainen | G01S 3/48 |
| | | | 370/310 |
| 2013/0342379 A1* | 12/2013 | Bauman | G01S 13/0209 |
| | | | 342/21 |
| 2014/0058586 A1* | 2/2014 | Kalhous | B60R 25/24 |
| | | | 701/2 |
| 2014/0129051 A1* | 5/2014 | Gautama | B60R 25/245 |
| | | | 701/2 |
| 2014/0169564 A1* | 6/2014 | Gautama | G07C 9/00309 |
| | | | 380/270 |
| 2014/0240091 A1* | 8/2014 | Talty | G07C 9/00309 |
| | | | 340/5.62 |
| 2014/0308971 A1* | 10/2014 | O'Brien et al. | H04W 4/046 |
| 2015/0063329 A1* | 3/2015 | Frye | H04W 8/22 |
| | | | 370/338 |
| 2015/0109116 A1* | 4/2015 | Grimm | B60R 25/1001 |
| | | | 340/426.18 |
| 2016/0049033 A1* | 2/2016 | Sigal | B60R 25/24 |
| | | | 340/5.61 |
| 2016/0318475 A1* | 11/2016 | Honkanen | G07C 9/00182 |

* cited by examiner

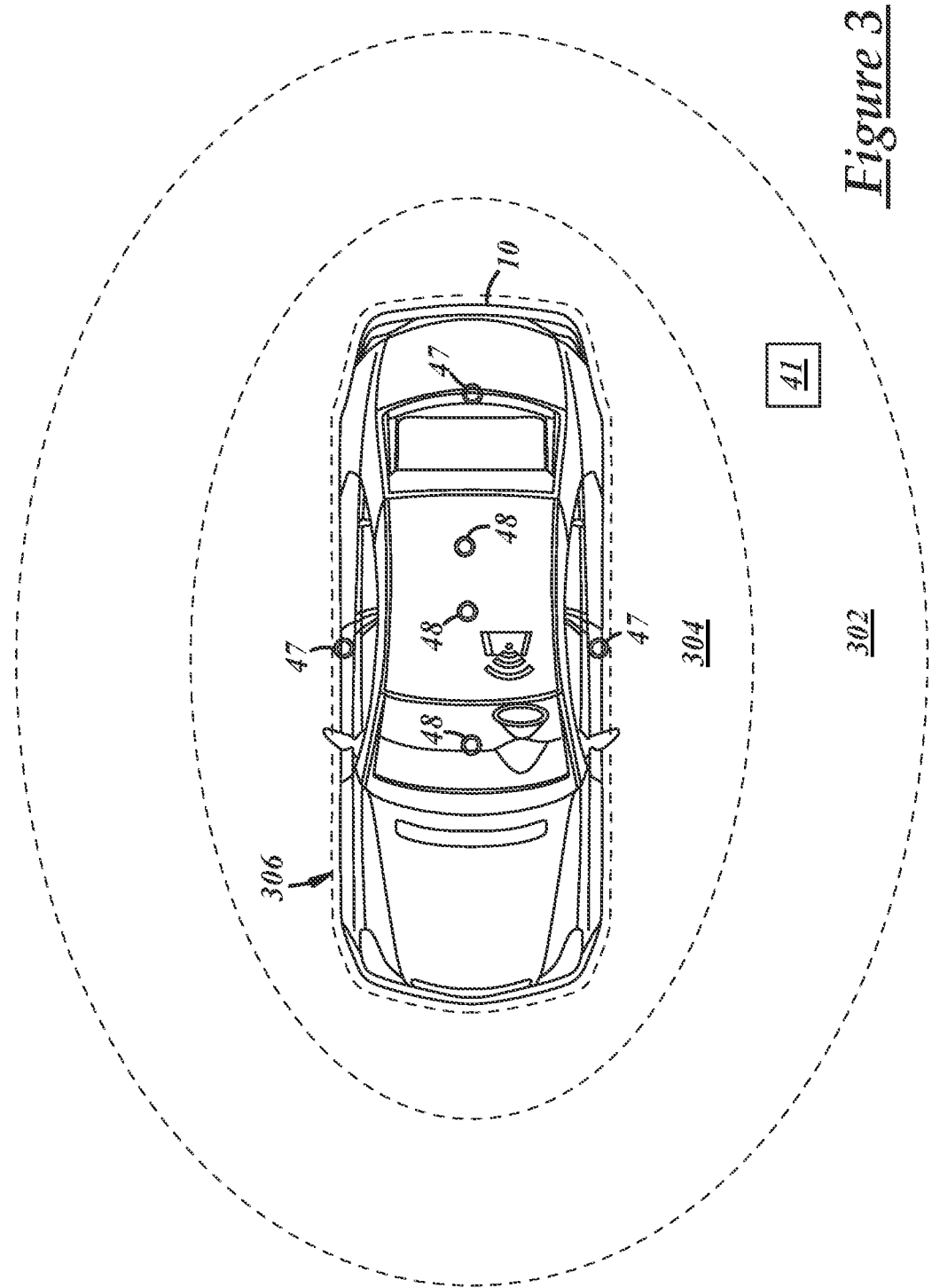

METHODS FOR LOCATING A VEHICLE KEY FOB

TECHNICAL FIELD

The present invention relates to passive entry passive start (PEPS) systems used in vehicles and, more particularly, to the use of Wi-Fi communications or Wi-Fi in conjunction with BLUETOOTH™ Low Energy (LE) to control vehicle access as part of a PEPS system.

BACKGROUND

Modern vehicles use wireless key fobs that restrict both interior access as well as the ability to operate the vehicle. Authorized vehicle users can carry the wireless key fobs and as they approach the vehicle it can determine whether the unique wireless signal transmitted by the key fob is authorized for access and/or operation. If so, the vehicle user can enter and subsequently start the vehicle. Before the vehicle user can start the vehicle, it determines whether or not the key fob is located inside the vehicle. Given that the threshold for the determination of being inside of or outside of the vehicle can be relatively small, resolving the location of the key fob in the vehicle may call for a high degree of accuracy. Presently, PEPS systems and key fobs can use wireless signals that fall on the low end of the frequency spectrum (e.g., ~30-400 kHz) to resolve location. Such signals have relatively long wavelengths and dissipate quickly, which function well to accurately determine a distance value between the key fob and the vehicle.

However, modern vehicles are more frequently becoming equipped with other wireless communications capabilities than those currently used by the PEPS systems. For example, the vehicles often can have an ability to facilitate communication with other wireless devices via BLUETOOTH™ LE or Wi-Fi in addition to the low frequency signals used by the current PEPS system. It may be helpful to replace the dedicated low-frequency signal transmission presently used by PEPS systems with the BLUETOOTH™ LE or Wi-Fi communication technologies. But BLUETOOTH™ LE and Wi-Fi operate using wireless frequencies that are much higher (2.4 GHz) than what the PEPS system presently relies on. These higher-frequency wireless signals may not produce a very accurate estimate of key fob location within the vehicle as they have a tendency to diffract and reflect off of interior surfaces in the vehicle and the surroundings. These reflected signals may be unsuitable to accurately determine the position of the key fob.

SUMMARY

According to an embodiment of the invention, there is provided a method of locating a key fob with respect to a vehicle. The method includes detecting a short-range wireless signal communicated between the key fob and a plurality of nodes at the vehicle using an IEEE 802.11 protocol; calculating the distance of the key fob relative to each of the nodes attached to the vehicle based on the detected short-range wireless signal; and determining the location of the key fob based on the distance of the key fob relative to each of the nodes.

According to another embodiment of the invention, there is provided a method of locating a key fob with respect to a vehicle. The method includes detecting a short-range wireless signal communicated between the key fob and the vehicle using a BLUETOOTH™ Low Energy (LE) protocol; determining the distance between the key fob and the vehicle using the detected short-range wireless signal; detecting another short-range wireless signal transmitted between the key fob and the vehicle using an IEEE 802.11 protocol; calculating the location of the key fob, relative to each of a plurality of nodes attached to the vehicle, using the IEEE 802.11 protocol wireless signal; and determining whether the key fob is located within the vehicle based on the calculations.

According to yet another embodiment of the invention, there is provided a method of locating a key fob with respect to a vehicle. The method includes detecting at the vehicle a short-range wireless signal transmitted by the key fob using a BLUETOOTH™ Low Energy (LE) protocol; comparing the detected short-range wireless signal to one or more known signal strength thresholds for the BLUETOOTH™ LE protocol; determining whether the key fob is within a predetermined range of the vehicle based on the comparison; initiating an 802.11 receiver using a plurality of nodes at the vehicle when the key fob is within the predetermined range of the vehicle; calculating the location of the key fob relative to each of the plurality of nodes using an IEEE 802.11 wireless signal received at each node; and determining whether the key fob is located within the vehicle based on the calculations.

BRIEF DESCRIPTION OF THE DRAWINGS

One or more embodiments of the invention will hereinafter be described in conjunction with the appended drawings, wherein like designations denote like elements, and wherein:

FIG. 3 is a projection view of an embodiment of a vehicle that is capable of using the method disclosed herein.

DETAILED DESCRIPTION OF THE ILLUSTRATED EMBODIMENT(S)

The system and method described below uses short-range wireless signals communicated between a key fob and a vehicle as part of a passive entry passive start (PEPS) feature using IEEE 802.11 (also interchangeably referred to as "Wi-Fi") protocols alone or Wi-Fi together with BLUETOOTH™ Low Energy (LE) to control access to a vehicle. The vehicle uses a plurality of nodes or sensors that are capable of receiving the short-range wireless signals sent via Wi-Fi, BLUETOOTH™ LE, or both and determining the key fob location using data obtained from the nodes. In one implementation, the vehicle can use multiple Wi-Fi nodes to receive a Wi-Fi signal and, using the different signal strength measurements taken at each node, calculate the location of the key fob. It is also possible to implement a system using multiple nodes at the vehicle that receive Wi-Fi signals as well as other nodes that receive BLUETOOTH™ LE signals sent from the key fob. The BLUETOOTH™ LE signals can be used to initially detect when the key fob has moved within a predetermined range surrounding the vehicle. After the vehicle has located the key fob within the predetermined range, the vehicle can then initiate or activate its use of a Wi-Fi receiver and Wi-Fi sensors to determine if the key fob is located inside or outside of the vehicle based on a signal transmitted by the key fob.

Wi-Fi protocols provide a greater bandwidth per channel than what is available using BLUETOOTH™ LE. For example, Wi-Fi offers channels having a bandwidth of 22 Mhz per channel relative to the 2 Mhz per channel offered by BLUETOOTH™ LE. The increased bandwidth can permit a higher sampling rate than is possible with the bandwidth offered by BLUETOOTH™ LE. The increased sampling rate, coupled with the use of a plurality of Wi-Fi nodes, can be used to accurately determine key fob location with a relatively high degree of accuracy. By using a PEPS system and key fob that uses both BLUETOOTH™ LE signals as well as Wi-Fi signals, the BLUETOOTH™ LE can be used as a low-energy monitoring system to determining when the key fob is nearby the vehicle. The Wi-Fi receiver can then be activated or placed in an operational state to receive wireless signals transmitted by the key fob using the Wi-Fi protocol only when the key fob is nearby. This can conserve the amount of energy dedicated to the PEPS system while the key fob is away from the vehicle.

Communications System—

Figure 1:
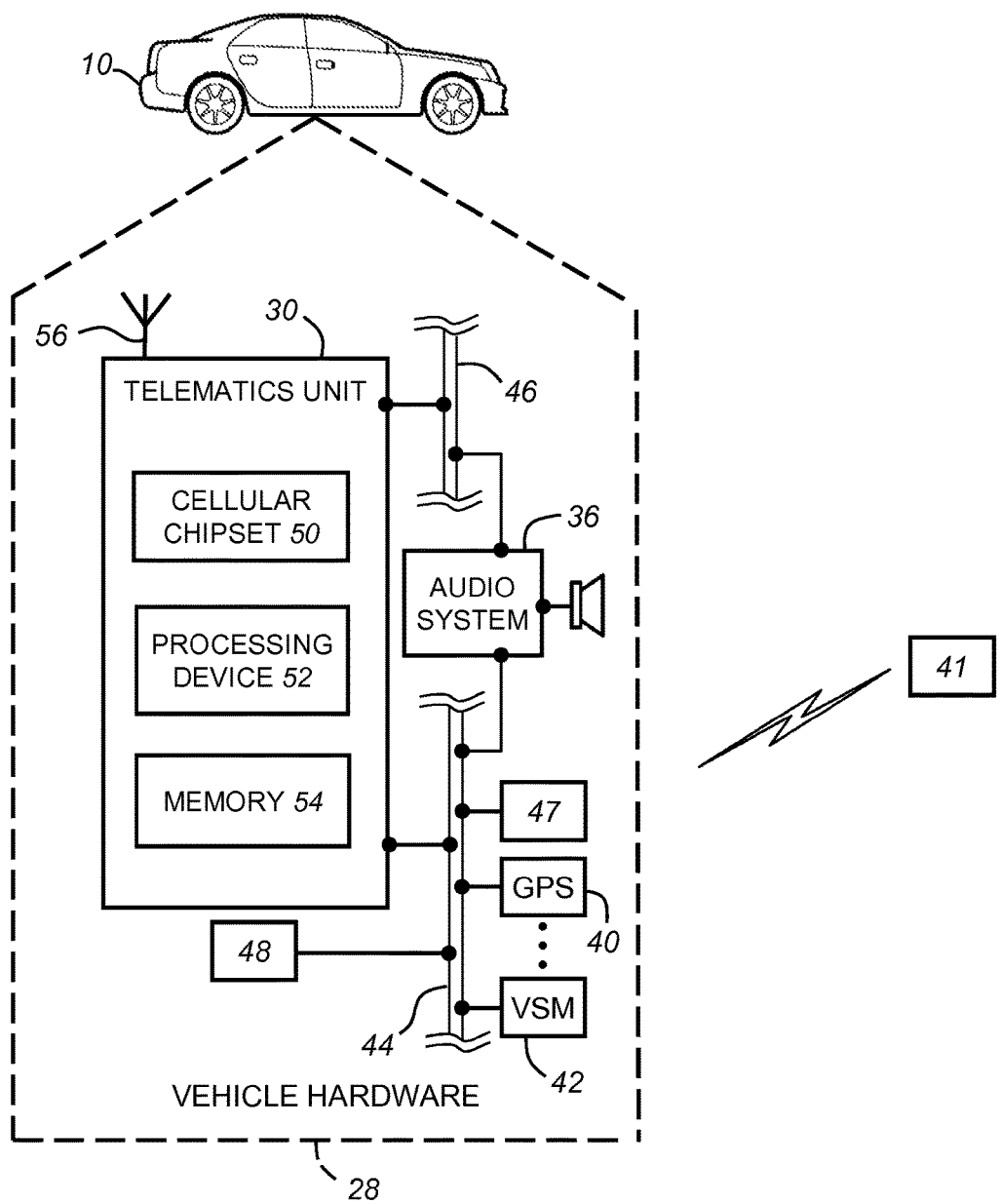
FIG. 1 is a block diagram depicting an embodiment of a vehicle that is capable of using the method disclosed herein.

With reference to FIG. 1, there is shown a vehicle 10 that can be used to implement the method disclosed herein. It should be understood that the disclosed method can be used with any number of different systems and is not specifically limited to the operating environment shown here. Also, the architecture, construction, setup, and operation of the vehicle 10 and its individual components are generally known in the art. Thus, the following paragraphs simply provide a brief overview of one such vehicle 10; however, other vehicle configurations not shown here could use the disclosed method as well.

Vehicle 10 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 are shown generally in FIG. 1 and includes a telematics unit 30 and a GPS module 40 as well as a number of vehicle system modules (VSMs) 42. Many of these devices are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over a wireless carrier system and via wireless networking. This enables the vehicle to communicate with call centers, other telematics-enabled vehicles, or some other entity or device. The telematics unit preferably uses radio transmissions to establish a communications channel (a voice channel and/or a data channel) with a wireless carrier system so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at a call center) and data communication (e.g., to provide GPS location data or vehicle diagnostic data to the call center), the system can utilize a single call over a voice channel and switch as needed between voice and data transmission over the voice channel, and this can be done using techniques known to those skilled in the art.

According to one embodiment, telematics unit 30 utilizes cellular communication according to either GSM, CDMA, or LTE standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as LTE, EVDO, CDMA, GPRS, and EDGE. Wireless networking between the vehicle and other networked devices can also be carried out using telematics unit 30. For this purpose, telematics unit 30 can be configured to communicate wirelessly according to one or more short-range wireless protocols, including short range wireless communication (SRWC) such as any of the IEEE 802.11 protocols, WiMAX, ZIG-BEE™, Wi-Fi direct, BLUETOOTH™ LE, or near field communication (NFC). When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation of GPS satellites. From these signals, the module 40 can determine vehicle position that is used for providing navigation and other position-related services to the vehicle driver. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center via the telematics unit 30.

Apart from the audio system 36 and GPS module 40, the vehicle 10 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module (BCM) that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 10, as numerous others are also possible.

The VSM 42 implemented as a body control module can also be used to provide the passive entry passive start (PEPS) functionality used at the vehicle 10. A key fob 41 transmits and receives short-range wireless signals sent using either the BLUETOOTH™ LE protocols or Wi-Fi protocols. As a vehicle user approaches the vehicle 10, a short-range wireless signal transmitted by the key fob 41 can be received using a plurality of BLUETOOTH™ LE nodes 47 or a plurality of Wi-Fi nodes 48 that are positioned inside of the vehicle 10. The BLUETOOTH™ LE nodes 47 and the Wi-Fi nodes 48 can also transmit short-range wireless signals that can be received by the key fob 41 according to the BLUETOOTH™ LE and WiFi protocols, respectively.

The key fob 41 can be implemented as a handheld wireless device that includes a microprocessor, a memory device, and an antenna capable of communicating wireless signals over a short distance (e.g., <50 meters) and located within a housing. In one implementation, the key fob 41 can be configured to use a symmetrical encryption scheme to securely communicate with a particular vehicle 10. For example, both the key fob 41 and the VSM 42 in the vehicle 10 can each receive a copy of a secret encryption key that is used to encode data sent over the short-range wireless signal. The secret key at either the key fob 41 or the VSM 42 can be used by a cryptographic hash function stored in the memory portion of either device to create a message authentication code (MAC). The MAC can be sent via the short-range wireless signal and received at the key fob 41 or VSM 42 where it can be authenticated using the secret key. In some configurations, the key fob 41 may be a dedicated device solely used to control vehicle functions, like opening vehicle doors or flashing exterior lights. Or in a different configuration, the key fob 41 can be integrated into a vehicle user's handheld wireless device, such as a smartphone or tablet that includes the ability establish BLUETOOTH™ LE and Wi-Fi connections.

The VSM 42 can be communicatively linked to the BLUETOOTH™ nodes 47 and the Wi-Fi nodes 48 via the vehicle communications bus 44 such that the content of the detected short-range wireless signals can be communicated to the VSM 42, the processor 52 of the vehicle telematics unit 30, or both. The VSM 42 can include computer-processing capabilities in the form of a microprocessor and optionally a computer-readable memory device that the microprocessor can access to retrieve executable computer programs and store data. The cryptographic hash function and secret key could be stored at the microprocessor itself using internal memory or the computer-readable memory device accessible by the microprocessor.

Method—

Figure 2:
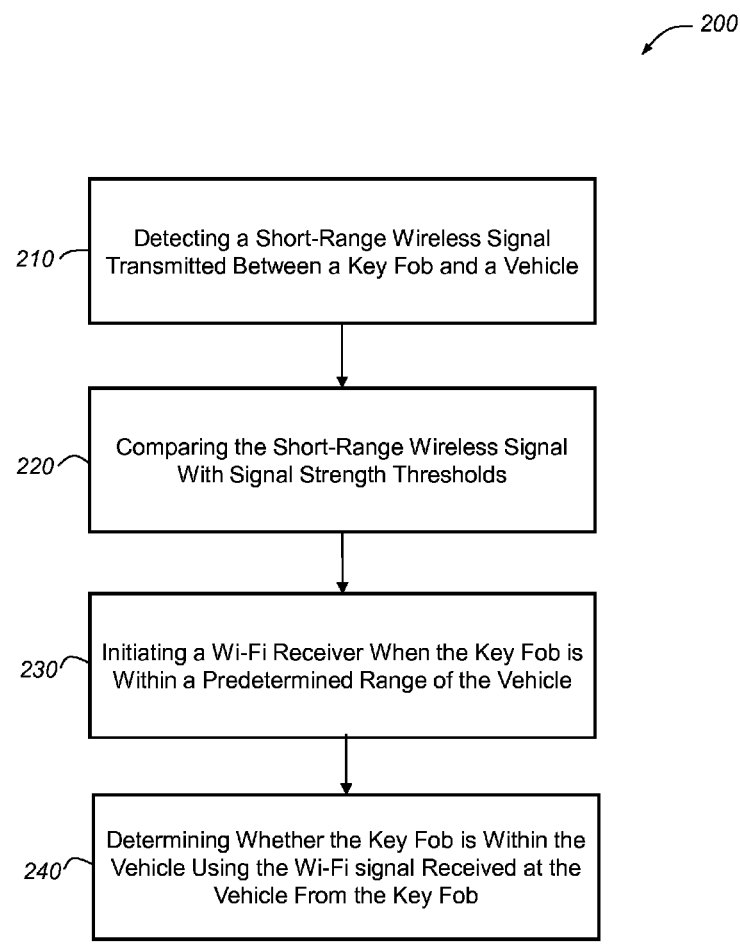
FIG. 2 is a flow chart depicting an embodiment of a method of locating a key fob with respect to a vehicle.

Turning now to FIG. 2, there is shown an embodiment of a method 200 of authenticating the key fob 41 with respect to the vehicle 10. The method 200 begins at step 210 by detecting a short-range wireless signal transmitted between the vehicle 10 and the key fob 41 using an BLUETOOTH™ Low Energy (LE) protocol. The vehicle 10 can periodically broadcast a BLUETOOTH™ LE interrogation signal from one or more BLUETOOTH™ LE nodes 47 that can be received by the key fob 41 within a defined area around the vehicle 10. As a person moves toward the vehicle 10 with the key fob 41, the key fob 41 begins receiving the short-range wireless signal transmitted by the vehicle 10. The key fob 41 can then use the BLUETOOTH™ LE interrogation signal to determine if the vehicle 10 is a trusted or authorized device that the key fob 41 can accept information from. If not, the key fob 41 can ignore the BLUETOOTH™ LE interrogation signal; otherwise, the key fob 41 can transmit a return short-range wireless signal to the vehicle 10 that may be received by one or more BLUETOOTH™ LE nodes 47. In one implementation, the return signal can include a MAC code created using a secret key stored at the key fob 41. The body control module VSM 42 can authenticate the received MAC code using its copy of the secret key to verify that the key fob 41 is permitted access to the vehicle 10. In some implementations, the key fob 41 can be authenticated using an out-of-band communication. For example, the vehicle 10 and the key fob 41 can communicate using BLUETOOTH™ LE via the BLUETOOTH™ LE nodes 47 and then pass the MAC code using the Wi-Fi between the key fob 41 and the Wi-Fi nodes 48.

The short-range wireless signal can be transmitted either by the key fob 41 or the nodes on the vehicle 10. In the former, the vehicle key fob 41 can generate the short-range wireless signal that—depending on the short-range wireless protocol being used—can be received at the nodes on the vehicle 10. When the key fob 41 is transmitting a BLUETOOTH™ LE signal, it can be received at each of the BLUETOOTH™ LE nodes 47. And when the key fob 41 is transmitting a Wi-Fi signal, the Wi-Fi nodes 48 can receive the signal. However, it should be appreciated that the nodes on the vehicle 10 can transmit short-range wireless signals that can be received by the vehicle key fob 41. For instance, when BLUETOOTH™ LE is used, each of the BLUETOOTH™ LE nodes 47 can transmit a short-range wireless signal that is received by the key fob 41. Or when Wi-Fi protocols are used, the vehicle 10 can wirelessly transmit signals to the key fob 41 using the Wi-Fi nodes 48. The method 200 proceeds to step 220.

At step 220, the detected short-range wireless signal is compared to one or more known signal strength thresholds and it is determined whether the key fob 41 is within a predetermined range of the vehicle 10. In addition to authentication, the vehicle 10 can also determine the location of the key fob 41 with accuracy using the Wi-Fi signals or the BLUETOOTH™ LE signals and Wi-Fi signals communicated between the key fob 41 and the BLUETOOTH™ LE nodes 47 and the Wi-Fi nodes 48. While the precise distance of the key fob 41 from the vehicle 10 may be challenging to determine at all points surrounding the vehicle 10 using a single node, detecting a BLUETOOTH™ LE signal and/or Wi-Fi signal transmitted between the key fob 41 and more than one node can facilitate an accurate calculation of the location of the key fob 41. The wireless signals between the BLUETOOTH™ LE nodes 47, the Wi-Fi nodes 48, and the key fob 41 can be used to can detect a number of performance variables. These variables can include signal strength and/or signal direction.

The body control module VSM 42 can compare the performance variables included in the received signals with the known location of each BLUETOOTH™ LE node 47 or Wi-Fi node 48 as well as the direction each node faces. Using performance variables such as signal strength and direction/angle at which the signal was received, the body control module or other device can also consider the location and direction of each node to calculate a precise location of the key fob 41 using the computer processing capability of its microprocessor. In one implementation, the key fob 41 can transmit a short-range wireless signal that is received by each node at the vehicle 10 depending on the short-range wireless protocol. However, the vehicle 10 can generate short-range wireless signals at a plurality of nodes (BLUETOOTH™ LE nodes 47 or Wi-Fi nodes 48) that can be received by the key fob 41. The key fob 41 can measure the performance characteristics of the received short-range wireless signals and then either calculate its position relative to the vehicle 10 or transmit the data for each received signal back to the vehicle 10 where location calculations can be carried out.

The calculation can compare a plurality of known distance-to-signal strength values stored at the vehicle 10 to performance variables measured at the BLUETOOTH™ LE nodes 47 and/or Wi-Fi nodes 48. That is, signal strength values for each amount of distance from the vehicle 10 can be stored and referred to when calculating the location of the key fob 41. In one example, a lookup table can include a distance value that corresponds to a plurality of signal strength values the number of which can correspond to the number of nodes 47 used. The signal strength values detected from the nodes can be matched to the signal strength values in the lookup table. When a match is found, the distance to the key fob 41 can be determined. The distance-to-signal strength values can be further refined by data indicating the angle at which the signal is received. The method 200 proceeds to step 230.

At step 230, a receiver that operates using IEEE 802.11 wireless protocols is initiated when the key fob 41 is within the predetermined range of the vehicle 10. In some implementations, short-range wireless signals sent using BLUETOOTH™ LE can be used to detect the distance of the key fob 41 from the vehicle 10 and Wi-Fi signals can be used to determine whether the key fob 41 is inside or outside of the vehicle 10 as well as a location of the key fob 41 within the vehicle 10. The vehicle telematics unit 30 can carry out short-range wireless communications using IEEE 802.11 (interchangeably referred to as Wi-Fi) protocols and act as the receiver. A plurality of zones surrounding the vehicle 10 can be defined and monitored for the presence of the key fob 41 within each of these zones. A projection view of the vehicle 10 is shown in FIG. 3 with an implementation of the BLUETOOTH™ LE nodes 47, the Wi-Fi nodes 48, and the plurality of zones. As the body control module detects the presence of the key fob 41 within a zone, the module can direct the vehicle 10 to initiate one or more vehicle functions. For example, the vehicle 10 can be surrounded by three virtual zones: a connection zone 302, a welcome zone 304, and a vehicle interior zone 306.

These zones can each be associated with different vehicle functions. In the connection zone 302, the vehicle 10 can initially detect the presence of the key fob 41 using the BLUETOOTH™ LE signal it transmits. While in the connection zone 302, the vehicle 10 can authenticate the key fob 41 but choose not to take any further action unless the key fob 41 comes closer to the vehicle 10. By authenticating the key fob 41 but activating no other vehicle function, the vehicle 10 can be ready for a vehicle occupant yet still remain in a power-saving mode in the event that the vehicle 10 is parked near the key fob 41 despite no forthcoming intention on the part of a user to operate the vehicle 10. This can occur when a key fob 41 remains in an owner's pocket while he mows the lawn near the vehicle 10 or leaves the key fob 41 nearby the vehicle 10. The size of the connection zone 302 can vary, but in some implementations it can range from 30-50 meters from the vehicle 10.

As the key fob 41 is brought closer to the vehicle 10, the fob 41 can enter a welcome zone 304 where the vehicle 10 can initiate a number of vehicle functions in anticipation that the user will soon use the vehicle 10. The vehicle 10 can continue to receive the BLUETOOTH™ LE signal from the key fob 41 at more than one BLUETOOTH™ LE node 47 and using the performance data from signal measurements gathered at each of the nodes 47, accurately determine the distance of the key fob 41 from the vehicle 10. For example, the body control module VSM 42 can unlock the doors, turn on the exterior lights, and/or move the driver's seat to one of a number of previously-stored positions. The welcome zone 304 can be defined by the area between the exterior surface of the vehicle 10 to the boundary of the connection zone 302 nearest the vehicle 12. The BLUETOOTH™ LE nodes 47 are shown spaced apart in the vehicle doors and the trunk area while the Wi-Fi nodes 48 are shown in the instrument panel, the center console, and the rear seat of the vehicle 10 also in a spaced apart relationship. However, it should be appreciated that the nodes 47, 48 can be combined together in a unit that shares a common housing in implementations other than what is shown in FIG. 3. The method 200 proceeds to step 240.

At step 240, the location of the key fob 41 relative to each of the Wi-Fi nodes 48 is calculated using a Wi-Fi wireless signal received at each of the Wi-Fi nodes 48. Using these calculations, it can be determined whether the key fob 41 is located within the vehicle 10, where inside the vehicle 10 the key fob 41 is located, or both. Generally speaking, the key fob 41 can broadcast a short-range wireless signal using a Wi-Fi protocol that is received at each of the Wi-Fi nodes 48. The performance variables of the signals detected at each of the Wi-Fi nodes 48 can then collectively be used to calculate the precise position of the key fob 41 using the computer processing capabilities of the VSM 42 or the processor 52 of the vehicle telematics unit 30. The location and direction of the Wi-Fi nodes 48 are known. Using the performance variables of the Wi-Fi signal 48 detected at each Wi-Fi node along with the location and direction of each Wi-Fi node, the vehicle telematics unit 30 or VSM 42 can then calculate whether the key fob 41 is within the interior of the vehicle 10.

The Wi-Fi signal strength transmitted by the key fob 41 can be resolved more accurately than the transmitted BLUETOOTH™ LE signal. As noted above, the Wi-Fi protocols offer a wider bandwidth, which can be used to increase the sampling rate used to receive and process the signal transmitted by the key fob 41. The increased sampling rate can increase the accuracy with which the location of the key fob 41 can be determined. When the vehicle telematics unit 30 or VSM 42 determines that the key fob 41 is located inside the vehicle 10, the body control module VSM 42 can permit the vehicle 10 to be started. This can be carried out by activating an ignition switch inside of the vehicle 10 that when selected cause the vehicle engine to start. Conversely, when the key fob 41 is determined to be outside of the vehicle 10, the body control module VSM 42 can deactivate the ability of a user to activate the ignition switch in the vehicle 10.

With respect to method 200, the key fob 41 and vehicle 10 are described as using signals sent using Wi-Fi protocols in conjunction with signals sent using a BLUETOOTH™ LE protocol. However, it should be understood that other configurations of this method can implement PEPS functionality using only the Wi-Fi wireless protocols. More specifically, the Wi-Fi wireless protocols can be used to determine whether the key fob 41 is located within a predetermined range of the vehicle 12 as well as the key fob 41 location inside or outside of the vehicle 10. The method 200 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of locating a key fob with respect to a vehicle, comprising the steps of:
    (a) periodically broadcasting an interrogation signal from the vehicle using a BLUETOOTH™ Low Energy (LE) protocol;
    (b) detecting at the vehicle a BLUETOOTH™ LE response signal from the key fob;
    (c) authenticating the key fob using the BLUETOOTH™ LE response signal;
    (d) monitoring a position of the key fob using short-range wireless signals communicated between the key fob and the vehicle using the BLUETOOTH™ LE protocol;
    (e) when the position of the key fob is within a predetermined distance from the vehicle, activating a receiver configured to operate using an IEEE 802.11 protocol;
    (f) detecting a short-range wireless signal communicated between the key fob and a plurality of nodes at the vehicle using the IEEE 802.11 protocol;
    (g) calculating the distance of the key fob relative to each of the nodes attached to the vehicle based on the detected short-range wireless signal; and
    (h) determining the location of the key fob based on the distance of the key fob relative to each of the nodes.

2. The method of claim 1, further comprising the step of determining whether the key fob is located within the vehicle based on the calculations in step (g).

3. The method of claim 1, wherein step (f) further comprises detecting at each node the short-range wireless signal transmitted by the key fob.

4. The method of claim 1, wherein step (f) further comprises detecting at the key fob the short-range wireless signal transmitted by each of the plurality of nodes.

5. The method of claim 1, further comprising the step of detecting an angle at which the short-range wireless signal is received at one or more of the nodes.

6. The method of claim 1, wherein step (g) is carried out using a lookup table that includes a distance value associated with a plurality of signal strength values.

7. The method of claim 1, further comprising the step of determining the key fob is within a predetermined range of the vehicle based on the short range wireless signal.

8. A method of locating a key fob with respect to a vehicle, comprising the steps of:
    (a) detecting a short-range wireless signal communicated between the key fob and the vehicle using a BLUETOOTH™ Low Energy (LE) protocol;
    (b) determining in which of a plurality of virtual zones surrounding the vehicle the key fob is located based on a calculation of the distance between the key fob and the vehicle using the detected short-range wireless signal;
    (c) initiating select vehicle functions based on the location of the key fob relative to the plurality of zones;
    (d) when the distance between the key fob and the vehicle is within a predetermined range, activating a receiver configured to detect another short-range wireless signal transmitted between the key fob and the vehicle using an IEEE 802.11 protocol;
    (e) calculating the location of the key fob, relative to each of a plurality of nodes attached to the vehicle, using the IEEE 802.11 protocol wireless signal; and (f) determining whether the key fob is located within the vehicle based on the calculations in step (e).

9. The method of claim 8, further comprising the step of detecting an angle at which the short-range wireless signal is received at one or more of the nodes.

10. The method of claim 8, wherein step (a), step (d), or both further comprises detecting at each node the short-range wireless signal transmitted by the key fob.

11. The method of claim 8, wherein step (a), step (d), or both further comprises detecting at the key fob the short-range wireless signal transmitted by each of the plurality of nodes.

12. The method of claim 8, wherein step (b), step (e), or both are carried out using a lookup table that includes a distance value associated with a plurality of signal strength values.

13. The method of claim 8, further comprising the step of authenticating the key fob using the short-range wireless signal transmitted by the key fob using the BLUETOOTH™ Low Energy (LE) protocol.

14. The method of claim 12, further comprising the step of detecting an angle at which the short-range wireless signal is received at one or more of the nodes.

15. The method of claim 12, wherein step (e) is carried out using a lookup table that includes a distance value associated with a plurality of signal strength values.

16. The method of claim 12, further comprising the step of authenticating the key fob using the short-range wireless signal transmitted by the key fob using the BLUETOOTH™ Low Energy (LE) protocol.

17. A method of locating a key fob with respect to a vehicle, comprising the steps of:
(a) detecting at a vehicle a short-range wireless signal transmitted by the key fob using a BLUETOOTH™ Low Energy (LE) protocol;
(b) comparing the detected short-range wireless signal to one or more known signal strength thresholds for the BLUETOOTH™ LE protocol;
(c) determining whether the key fob is within a predetermined range of the vehicle based on the comparison in step (b);
(d) initiating an 802.11 receiver using a plurality of nodes at the vehicle when the key fob is within the predetermined range of the vehicle;
(e) calculating the location of the key fob relative to each of the plurality of nodes using an IEEE 802.11 wireless signal received at each node; and
(f) determining whether the key fob is located within the vehicle based on the calculations in step (e).

* * * * *